US010047670B2

(12) United States Patent
Bruestle

(10) Patent No.: US 10,047,670 B2
(45) Date of Patent: Aug. 14, 2018

(54) INTERNAL COMBUSTION ENGINE HAVING AT LEAST ONE PISTON

(71) Applicant: Neander Motors AG, Kiel (DE)

(72) Inventor: Claus Bruestle, Nordheim (DE)

(73) Assignee: Neander Motors AG, Keil (DE)

( * ) Notice: Subject to any disclaimer, the term of this patent is extended or adjusted under 35 U.S.C. 154(b) by 107 days.

(21) Appl. No.: 14/989,168

(22) Filed: Jan. 6, 2016

(65) Prior Publication Data

US 2016/0195009 A1    Jul. 7, 2016

(30) Foreign Application Priority Data

Jan. 7, 2015    (DE) .................. 10 2015 000 122

(51) Int. Cl.
*F02B 75/32*    (2006.01)
*F02B 75/26*    (2006.01)
(Continued)

(52) U.S. Cl.
CPC .......... *F02B 75/265* (2013.01); *F02B 75/065* (2013.01); *F16C 9/04* (2013.01); *F02B 75/32* (2013.01)

(58) Field of Classification Search
CPC ............... F02B 75/12; F02B 75/065
(Continued)

(56) References Cited

U.S. PATENT DOCUMENTS 5,595,147 A * 1/1997 Feuling ................. F02B 75/065
  123/197.1
5,836,273 A * 11/1998 Hair ........................ F01B 9/02
  123/197.4

(Continued)

FOREIGN PATENT DOCUMENTS

DE    10 2006 060 660 A1    6/2008
DE    10 2006 036 827 B4    5/2010
(Continued)

OTHER PUBLICATIONS

German-language Office Action issued in counterpart German Application No. 10 2015 000 122.1 dated Aug. 7, 2015 (two pages).
(Continued)

*Primary Examiner* — Jacob Amick
*Assistant Examiner* — Charles Brauch
(74) *Attorney, Agent, or Firm* — Crowell & Moring LLP

(57) ABSTRACT

An internal combustion engine has at least one piston which performs stroke movements in a cylinder crankcase. Via two connecting rods, the piston interacts with two parallel crankshafts which rotate synchronously in opposite directions. The connecting rods have, on a side facing toward a piston crown of the piston, bearing eyelets which, via piston pins, are operatively connected to the first and second bearings provided at opposite first and second sides of the piston, which bearings and piston pins act as a device for compensating an asymmetry of the profile of the crankshafts. To optimize the internal combustion engine, the first and the second bearings have cylindrical bearing disks which, firstly, are rotatably mounted in piston bores and which, secondly, include disk bores for receiving first and second pin sections of the piston pins.

12 Claims, 2 Drawing Sheets

(51) Int. Cl.
*F02B 75/06* (2006.01)
*F16C 9/04* (2006.01)

(58) Field of Classification Search
USPC ...................................... 123/197.1
See application file for complete search history.

(56) References Cited

U.S. PATENT DOCUMENTS

| | | | |
|---|---|---|---|
| 2002/0134633 A1* | 9/2002 | Dahlin | F16D 13/52 |
| | | | 192/13 R |
| 2007/0137422 A1* | 6/2007 | Betzmeir | F16C 7/023 |
| | | | 74/579 E |
| 2010/0077984 A1 | 4/2010 | Baindl et al. | |
| 2012/0055443 A1* | 3/2012 | Betzmeir | F02B 75/065 |
| | | | 123/197.4 |
| 2012/0060789 A1* | 3/2012 | Yun | F16J 1/18 |
| | | | 123/193.6 |
| 2014/0041385 A1 | 2/2014 | Wittwer | |

FOREIGN PATENT DOCUMENTS

| | | |
|---|---|---|
| DE | 10 2012 015 907 B3 | 10/2013 |
| EP | 2 426 336 A2 | 3/2012 |
| EP | 2 792 846 A1 | 10/2014 |
| EP | 3 171 000 A1 | 5/2017 |

OTHER PUBLICATIONS

German-language European Search Report issued in counterpart European Application No. 15003275.3 dated May 30, 2016 with partial English translation (six pages).

* cited by examiner

INTERNAL COMBUSTION ENGINE HAVING AT LEAST ONE PISTON

CROSS REFERENCE TO RELATED APPLICATIONS

This application claims priority under 35 U.S.C. § 119 from German Patent Application No. 10 2015 000 122.1, filed Jan. 7, 2015, the entire disclosure of which is herein expressly incorporated by reference.

BACKGROUND AND SUMMARY OF THE INVENTION

The invention relates to an internal combustion engine having at least one piston which performs stroke movements in a cylinder crankcase and which, via two connecting rods, interacts with two parallel crankshafts which rotate synchronously in opposite directions.

A reciprocating-piston assembly is known, from EP 2 426 336 A2, which includes a reciprocating piston. The reciprocating piston is connected via two connecting rods to two crankshafts which are oriented parallel to one another. Each crankshaft is equipped with a synchronization gearwheel, wherein the two synchronization gearwheels are in the form of spur gears and are in engagement with one another such that said gearwheels rotate synchronously with the crankshafts in opposite directions.

In the case of assemblies of this type of construction, adverse addition of manufacturing tolerances, thermal influences during operation or wear on the tooth flanks of the synchronization gearwheels may give rise to a clearance between the intermeshing synchronization gearwheels. This clearance gives rise to an asymmetry during the rotation of the two crankshafts, which asymmetry can lead to undesired tilting of the piston in the cylinder of the reciprocating-piston assembly. Owing to the asymmetry of the rotation of the crankshafts, the crankshafts duly rotate in temporally synchronized fashion in opposite directions but, during the rotation of the two crankshafts, one of the crankshafts leads the other crankshaft, such that the crankshaft-side connecting rod spindles reach their top dead center not simultaneously but successively. This has the result that the piston-side connecting rod bearings also reach their top dead center temporally in succession, which results in a tilting movement of the piston. The advance of one crankshaft in relation to the other crankshaft exists throughout the rotation of the synchronized crankshafts, giving rise to the stated systemic asymmetry. The latter has the effect that, when the piston is at top dead center, a tilting moment toward one side acts on the piston, and when the piston is at bottom dead center, a corresponding tilting moment toward the other side acts on the piston.

To compensate the asymmetry of the rotation of the two crankshafts, it is provided in the above-cited EP 2 426 336 A2 that the piston-side pivot bearings of the connecting rod are articulatedly connected to a device which, in the form of a cylindrical bearing element, is pivotably articulated in a bearing bore of the piston. A tilting of the piston, with its piston longitudinal axis, relative to the cylinder longitudinal axis is thereby counteracted.

DE 10 2006 036 827 B4 discloses a power or working machine with a single reciprocating piston and with two crankshafts which extend parallel to one another with a spacing. Two connecting rods act between the oppositely rotating crankshafts, which are in engagement by way of synchronization gearwheels, and the reciprocating piston. In order that tilting of the piston in the cylinder caused by the asymmetry during the rotation of the two crankshafts does not have an adverse effect on the functional back-and-forth movement of the reciprocating piston, the reciprocating piston is designed as follows: in a cross-sectional plane lying perpendicular to the axes of rotation of the crankshafts, the reciprocating piston has a radius which varies along the piston axis. This is such that the piston has, adjacent to the cylinder inner wall, a region which has a greater diameter than the piston regions above and below the region. Even in the event of slight tilting of the piston, only the relatively short section of the piston with the largest diameter makes contact with the piston wall. In this way, the risk of jamming of the piston is greatly reduced.

It is an object of the invention to design a high-grade reciprocating-piston assembly with a reciprocating piston and with two crankshafts which are arranged parallel to one another and which are connected by way of connecting rods to the reciprocating piston, and a device for compensating an asymmetry of the rotation of the crankshafts. Here, it should be ensured that the device can be easily realized and contributes to good functioning of the reciprocating-piston assembly.

This and other objects are achieved in accordance with the invention by an internal combustion engine having at least one piston which performs stroke movements in a cylinder crankcase and which, via two connecting rods, interacts with two parallel crankshafts which rotate synchronously in opposite directions, wherein the connecting rods have, on a side facing toward a piston crown of the piston, bearing eyelets which, via piston pins, are operatively connected to the first and second bearings provided at opposite first and second sides of the piston. These bearings and piston pins act as a device for compensating an asymmetry of the profile of the crankshafts, wherein the first and the second bearings for the device have cylindrical bearing disks which, firstly, are rotatably mounted in piston bores and which, secondly, comprise disk bores for receiving first and second pin sections of the piston pins.

The main advantages attained with the invention can be seen in the fact that the device for compensating a possible asymmetry of the profile of the crankshafts contributes to the efficient operation of the internal combustion engine in an ideal manner. This is assisted by the two standard-setting cylindrical bearing disks and the piston pins which, with regard to structural design, can be produced easily and under expedient conditions. The bearing disks are received by the piston bores in an excellent manner; likewise, the first and second pin sections of the piston pins in the disk bores. It is to be emphasized that, owing to the different diameters of the pin sections it is possible for there to be provided on the respective piston pin a step with a collar in the form of a stop, which collar is supported on an inner side of an associated bearing disk. The laterally reversed arrangement of the piston pins ensures a targeted transmission of force from the piston to the connecting rods. Commercially available, inexpensive circlips, which act between the piston bores and the bearing disks, are suitable for axially securing the bearing disks; corresponding circlips may also be used between the piston pins and the bearing disks. Owing to the sophisticated structural solution of the piston pins, that is to say the step with a collar in the form of a stop, in each case only one circlip is required to axially secure the piston pins in the pin bores. Finally, the bearing disks are equipped with thickened disk portions in the region of the first and second pin sections in order to realize an advantageous bearing base.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
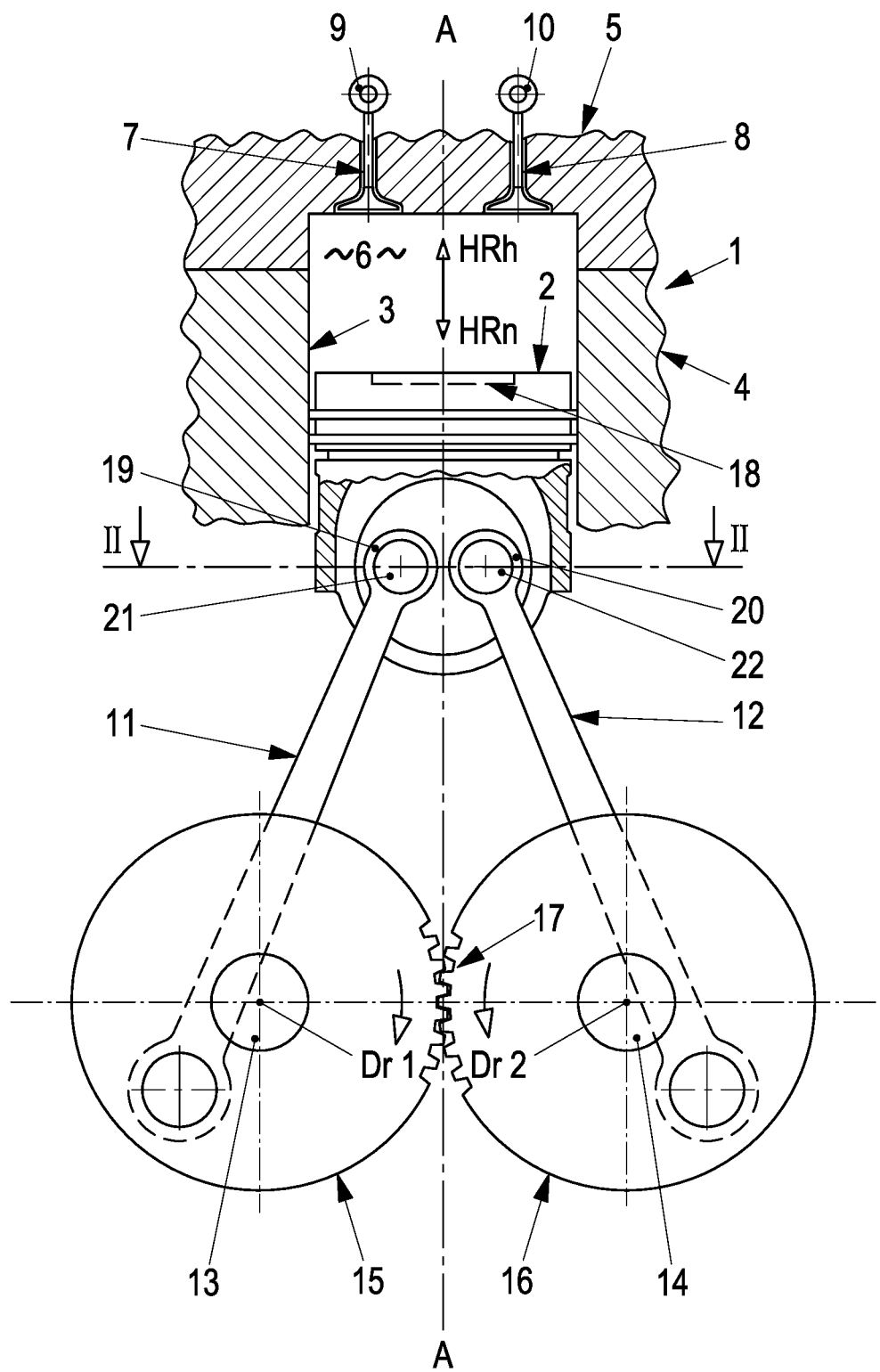
FIG. 1 is a schematic partial cross sectional view through an internal combustion engine 1.

An internal combustion engine 1 that can be used, for example, as an outboard motor—FIG. 1—has at least one piston 2 which, in a piston bore 3 of a cylinder crankcase 4, performs stroke movements in the directions HRh and HRn. The internal combustion engine 1 operates as a four-stroke engine on the diesel cycle with direct injection, and is equipped with exhaust-gas turbocharging (not illustrated). The cylinder crankcase 4 bears a cylinder head 5 which, together with a sub-region of the piston bore 3, delimits a combustion chamber 6. To control the fuel-air mixture and the exhaust gases in the combustion chamber 6, at least one inlet valve 7 and one outlet valve 8 are provided which are actuated by way of overhead camshafts 9 and 10.

Figure 2:
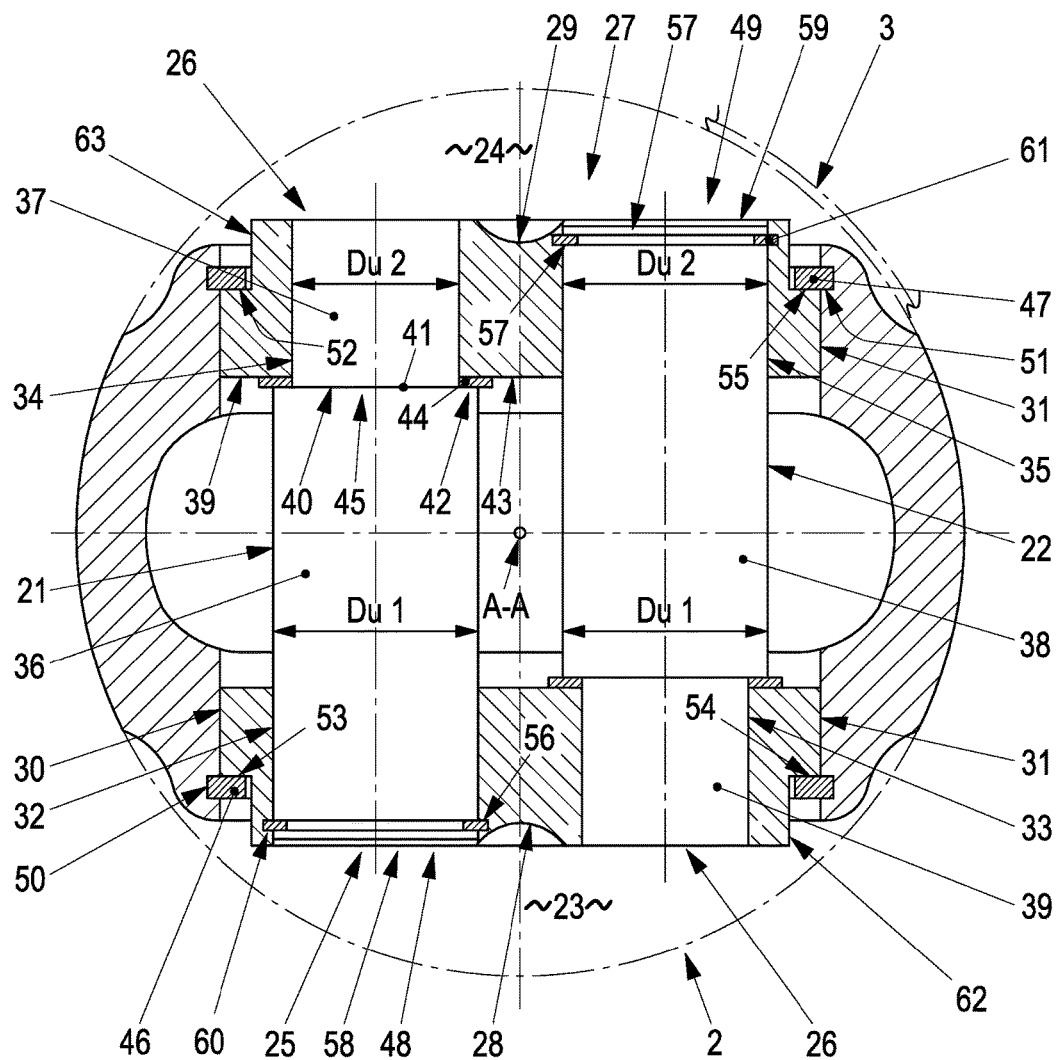
FIG. 2 is a sectional view taken along the line II-II of FIG. 1.

The piston 2 is coupled to two connecting rods 11 and 12 which are operatively connected to two parallel crankshafts 13 and 14. Two synchronization gearwheels 15 and 16 act between the crankshafts 13 and 14. The synchronization gearwheels are in engagement with one another by way of a spur gear mechanism 17. In this way, the synchronization gearwheels 15 and 16 rotate synchronously in opposite directions Dr1 and Dr2. Extending between the synchronization gearwheels 15 and 16 there is a central longitudinal plane A-A which encompasses a central longitudinal plane of the piston 2 and/or of the piston bore 3. On a side facing toward a piston crown 18 of the piston 2, the connecting rods 11 and 12 have bearing eyelets 19 and 20. The bearing eyelets 19 and 20 are operatively connected, via piston pins 21 and 22, to first and second bearings 25 and 26 provided on opposite first and second outer sides 23 and 24—FIG. 2—of the piston 2.

The first and second bearings 25 and 26 together with the piston pins 21 and 22, which are illustrated as identical parts, and the bearing eyelets 19 and 20 of the connecting rods 11 and 12 form, in each case, one device 27 for compensating an asymmetry of the profile of the crankshafts 13 and 14. The device 27 has, at the bearings 25 and 26 of the piston 2, two substantially identical cylindrical bearing disks 28 and 29 which, firstly, are rotatably mounted in piston bores 30 and 31 and, secondly, comprise disk bores 32, 33 and 34, 35 for receiving first and second pin sections 36, 37 and 38, 39 of the piston pins 21 and 22.

The pin sections 36 and 37, for example of the piston pin 21, are designed such that a diameter Du1 of the first pin section 36 is greater than a diameter Du2 of the second pin section 37 of the piston pin 21. Between the first pin section 36 and the second pin section 37 there is provided a step 40 with a collar 42 in the form of a stop 41, which collar, adjacent to the second pin section 37, extends as far as an inner side 43 of the associated bearing disk 29. The collar 42 is supported, via a spacer ring 44, on an inner side 45, which is directed toward the central longitudinal plane A-A, of the bearing disk 29.

The piston pins 21 and 22 are inserted, laterally reversed with respect to one another, into the disk bores 32, 33 and 34, 35, specifically in such a way that the first pin section 36 of the piston pin 21 moves in the disk bore 32 of the first bearing disk 28. By contrast, the first pin section 38 of the piston pin 22 is received by the disk bore 35 of the second bearing disk 29.

To axially secure the bearing disks 28 and 29 in the piston bores 30 and 31, use is made of first circlips 46 and 47 which are held, proceeding from the sides 23 and 24 of the piston 2, in grooves 50 and 51 provided adjacent to end regions 48 and 49 of the first pin sections 36 and 38. The grooves 50 and 51 are formed into the piston bores 30 and 31, and the circlips 46 and 47 are supported on stops 52 and 53 of collars 54 and 55 of the bearing disks 28 and 29. To axially secure the piston pins 21 and 22 in the disk bores 32 and 34, second circlips 56 and 57 are provided. These are inserted, close to end regions 58 and 59 of the first pin sections 36 and 38, into grooves 60 and 61 of the disk bores 32 and 35 and into corresponding grooves of the pin sections 36 and 38.

Finally, the bearing disks 28 and 29 are equipped, in the region of the first and second pin sections 36, 37 and 38, 39, with thickened disk portions 62 and 63 in order to realize a targeted bearing base for the pin sections 36, 37 and 38, 39.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
a cylinder crankcase;
at least one piston which performs stroke movements in the cylinder crankcase;
two parallel crankshafts;
two connecting rods via which the piston interacts with the two parallel crankshafts to rotate the crankshafts synchronously in opposite directions, wherein
the two connecting rods have, on a side facing towards a piston crown of the piston, bearing eyelets which, via piston pins, are operatively connected to first and second bearings provided at opposite first and second sides of the piston,
the first and second bearings include cylindrical bearing discs which are rotatably mounted in piston bores and comprise disk bores for receiving first and second pin sections of the piston pins,
whereby the first and second bearings and the piston pins function to compensate an asymmetry of rotation of the two parallel crankshafts.

2. The internal combustion engine according to claim 1, wherein a diameter of the first pin section is greater than a diameter of the second pin section for each of the respective piston pins.

3. The internal combustion engine according to claim 2, wherein:
between the first pin section and the second pin section, a step having a collar formed as a stop is provided, and
the collar is supported against an inner side of a respective one of the cylindrical bearing disks.

4. The internal combustion engine according to claim 3, wherein a spacer ring is provided between the collar and the bearing disk.

5. The internal combustion engine according to claim 4, wherein:

the piston pins are inserted, laterally reverse respect to one another, into the disk bores such that the first pin section of one piston pin rests in the first bearing disk, and the first pin section of the other piston pin is received by the second bearing disk.

6. The internal combustion engine according to claim 1, wherein:

the piston pins are inserted, laterally reverse respect to one another, into the disk bores such that the first pin section of one piston pin rests in the first bearing disk, and the first pin section of the other piston pin is received by the second bearing disk.

7. The internal combustion engine according to claim 5, further comprising:

circlips configured to be inserted into grooves on end regions of the first pin sections of the piston pins in order to axially secure the piston pins in the cylindrical bearing disks.

8. The internal combustion engine according to claim 1, further comprising:

circlips configured to be inserted into grooves on end regions of the first pin sections of the piston pins in order to axially secure the piston pins in the cylindrical bearing disks.

9. The internal combustion engine according to claim 7, wherein the grooves for the circlips are formed at least into the first pin sections of the piston pins.

10. The internal combustion engine according to claim 1, further comprising:

circlips arranged to act between the piston bores and the cylindrical bearing disks in order to axially secure the cylindrical bearing disks in the piston bores.

11. The internal combustion engine according to claim 10, wherein the circlips for the bearing disks are inserted into grooves formed into the piston bores adjacent to first and second outer sides of the piston.

12. The internal combustion engine according to claim 1, wherein the cylindrical bearing disks are configured with thickened disk portions in a region of the first and second pin sections.

* * * * *